US006772824B1

(12) United States Patent
Tsuruta (10) Patent No.: US 6,772,824 B1
(45) Date of Patent: Aug. 10, 2004

(54) COOLING SYSTEM FOR VEHICLE (75) Inventor: Yuichiro Tsuruta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 09/654,136

(22) Filed: Sep. 1, 2000

(30) Foreign Application Priority Data

Sep. 3, 1999 (JP) .......................................... 11-250971

(51) Int. Cl.⁷ .......................................... B60K 11/04
(52) U.S. Cl. ........................ 165/41; 165/51; 165/99; 165/67; 165/69; 180/68.1; 180/68.4; 123/41.49
(58) Field of Search .............................. 165/99, 41, 51; 237/12.3 B, 12.3 R; 67/69; 180/68.1, 68.4; 123/41.49

(56) References Cited

U.S. PATENT DOCUMENTS

| | | | | |
|---|---|---|---|---|
| 1,840,417 A | * | 1/1932 | Seelert | 165/69 |
| 1,988,693 A | * | 1/1935 | MacLeod | 165/99 |
| 2,003,045 A | * | 5/1935 | Griffiths | 165/99 |
| 2,015,231 A | * | 9/1935 | Marty et al. | 165/67 |
| 2,087,160 A | * | 7/1937 | Meyerhoefer | 165/99 |
| 2,118,281 A | * | 5/1938 | Witt et al. | 165/67 |
| 2,238,585 A | * | 4/1941 | Findley | 237/12.3 B |
| 2,278,376 A | * | 3/1942 | Young | 165/69 |
| 2,377,094 A | * | 5/1945 | Meyerhoefer | 165/99 |
| 2,623,735 A | * | 12/1952 | Schofield et al. | 165/99 |
| 2,699,323 A | * | 1/1955 | Bergstrom | 165/99 |
| 2,900,172 A | * | 8/1959 | Schofield | 165/69 |
| 3,258,066 A | * | 6/1966 | Becher et al. | 165/69 |
| 3,319,708 A | * | 5/1967 | Nelson | 165/69 |
| 3,369,595 A | * | 2/1968 | Nelson | 165/69 |
| 3,858,291 A | * | 1/1975 | Perpall | 165/69 |
| 4,315,540 A | * | 2/1982 | Moranne | 165/67 |
| 4,386,735 A | * | 6/1983 | Tholen et al. | 237/12.3 R |
| 4,461,366 A | * | 7/1984 | Honda | 180/229 |
| 5,220,973 A | * | 6/1993 | Murau et al. | 165/67 |

FOREIGN PATENT DOCUMENTS

| | | | |
|---|---|---|---|
| DE | 3446752 | * | 7/1986 |
| JP | A5456820 | | 4/1979 |
| JP | 57-13214 | * | 1/1982 |
| JP | 57-33019 | * | 2/1982 |
| JP | 58-185322 | * | 10/1983 |
| JP | 59-105918 | * | 6/1984 |
| JP | 59-195098 | * | 11/1984 |
| JP | 59-197796 | * | 11/1984 |
| JP | 59-218319 | * | 12/1984 |
| JP | 61-122030 | * | 6/1986 |
| JP | 62-101818 | * | 2/1987 |
| JP | 62-101818 | * | 5/1987 |
| JP | A6235675 | | 9/1987 |
| JP | 63-106320 | * | 5/1988 |
| JP | 4-262983 | * | 9/1992 |
| JP | A1018843 | | 1/1998 |
| JP | 11-91669 | * | 4/1999 |
| JP | 2001/71756 | * | 3/2001 |

* cited by examiner

Primary Examiner—John K. Ford
(74) Attorney, Agent, or Firm—Birch, Stewart, Kolasch & Birch, LLP (57) ABSTRACT To facilitate mounting of an oil cooler and a cooling fan. An oil cooler which is a cooler and a cooling fan are accommodated in the same case to form a cooling unit. This case is divided into a lid on the front half portion side and a fan cover on the rear half portion side, and the oil cooler is accommodated in the lid while the cooling fan is accommodated in the fan cover. The two members are put together from the front and the rear and are integrated with each other by means of fastening screws. Suspending projections project on the left and right of an upper face of the lid, and are attached to upper pipes, which are part of a vehicle body frame, through suspending brackets. Further, the oil cooler is accommodated in the lid in a state wherein damper rubber members are applied to four corners thereof. Consequently, the damper rubber members function as a rubber mounting structure in a non-coupled state wherein they are merely interposed between a joint recess and the oil cooler.

13 Claims, 7 Drawing Sheets

PRIOR ART

US 6,772,824 B1

COOLING SYSTEM FOR VEHICLE

BACKGROUND OF THE INVENTION

1. Field of the Invention

This invention relates to a vehicle body mounting structure for a cooler such as an oil cooler which is used together with a cooling fan.

2. Description of Background Art

Figure 7:
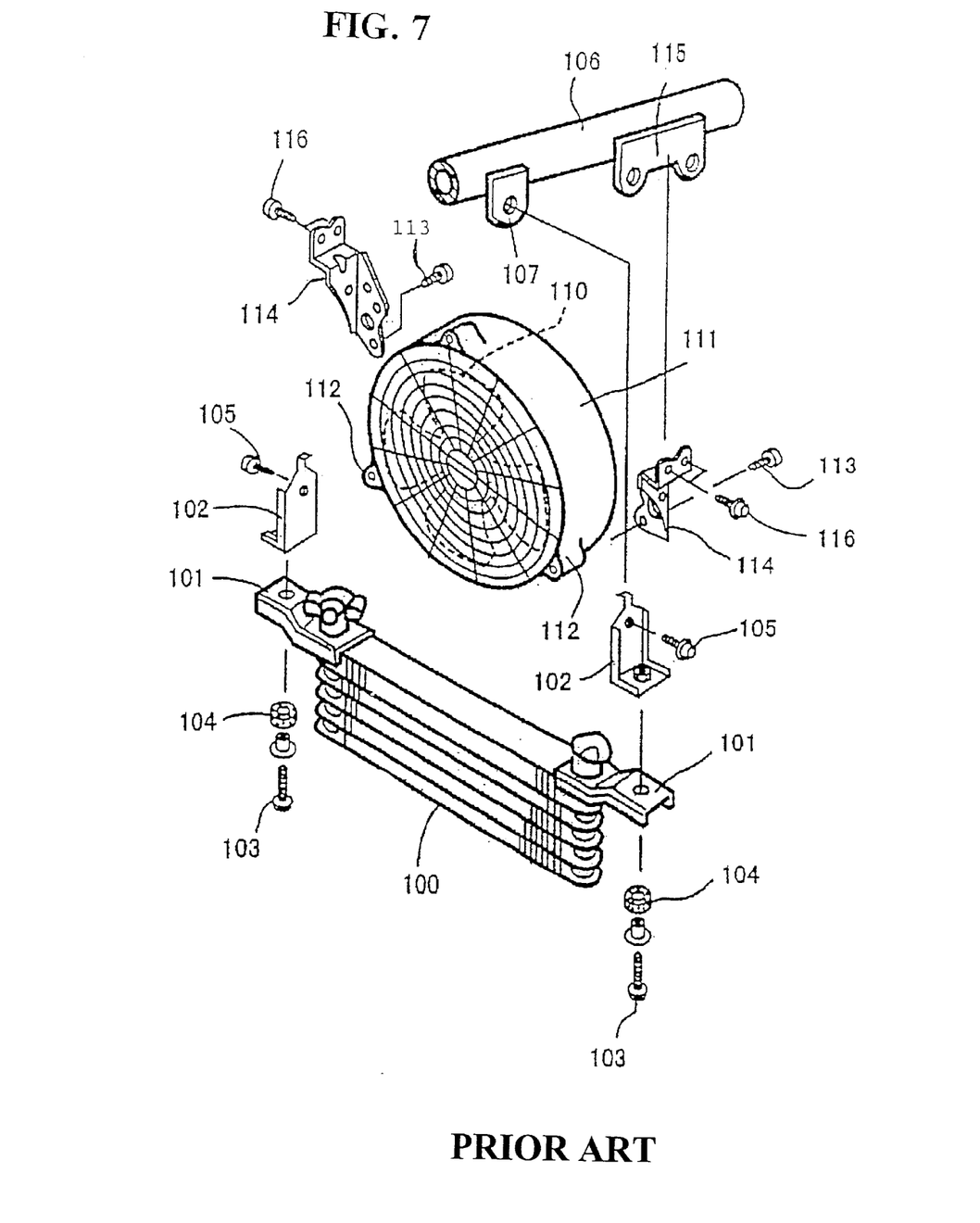
FIG. 7 is an exploded view of a conventional example.

FIG. 7 shows a conventional vehicle body mounting structure for a cooler and a cooling fan. A cooler 100 has mounting portions 101 on the left and right of an upper portion thereof, and lower ends of suspending brackets 102 are attached to the mounting portions 101 by means of bolts 103 with mounting rubber members 104 of the bush type interposed therebetween while upper ends of the suspending brackets 102 are attached to stays 107 provided on a vehicle body frame 106 with bolts 105. A cooling fan 110 for forced cooling is disposed rearwardly in the proximity of the cooler 100 and is accommodated in a cylindrical shroud 111. Suspending brackets 114 are each attached at one end thereof by means of bolts 113 to a boss 112 provided on the shroud 111. The suspending brackets 114 are attached at the other ends thereof to stays 115 provided separately from the stays 107 on the vehicle body frame 106 by means of bolts 116. Further, it is known to mount a cooling fan directly on the rear face of a radiator by use of rubber mounts for the cooling fan (for example, Japanese Utility Model Laid-open No. Sho 54-56820) Also it is known to mount a frame, in which a radiator and so forth are accommodated, on the vehicle body side (refer to, for example, Japanese Utility Model Publication No. Sho 62-35675 and Japanese Patent Laid-open No. Hei 10-1884)

By the way, in the case of the structure shown in FIG. 7, since the cooler 100 and the cooling fan 110 must be mounted separately from each other on the vehicle body frame 106, the suspending brackets 102 and 114 and the stays 107 and 115 must be provided separately from each other, and the number of parts and the number of mounting steps increase. In addition, time is required for separately, fixedly mounting the mount rubber members.

Meanwhile, if a type of cooling fan is provided that is mounted directly on a radiator as in Japanese Utility Model Laid-open No. Sho 54-56820 and Japanese Patent Laid-open No. Hei 10-18843, then the necessity to mount the cooling fan by itself on the vehicle body side is eliminated. However, in principle, the upward and downward dimension of a radiator is greater than the diameter of a cooling fan and a special frame structure section for mounting a cooling fan is required, and it is difficult to mount a cooling fan directly on a cooler of a small size such as an oil cooler. Further, similar problems to those described above apply also to the rubber mounting structure.

SUMMARY AND OBJECTS OF THE INVENTION

It is an object of the invention of the present application to make it possible to integrate a cooling fan with a cooler without directly attaching them to each other and to facilitate mounting onto a vehicle body and facilitate rubber mounting.

In order to solve the above-identified problems, according to a first aspect of the present invention relating to a cooling system for a vehicle, a cooling system for a vehicle which includes a cooler and a cooling fan disposed rearwardly in the proximity of the cooler and wherein the cooler and the cooling fan are supported on a vehicle body is characterized in that the cooler and the cooling fan are accommodated in a unitary case to form the cooler and the cooling fan into a unit.

A second aspect of the present invention is characterized in that, in the first aspect of the present invention, the case is divided forwardly and rearwardly into a front half portion side in which the cooler is accommodated and a rear half portion side in which the cooling fan is accommodated, and the front half portion side and the rear half portion side are put together from forwardly and backwardly and connected to and integrated with each other.

A third aspect of the present invention is characterized in that, in the second aspect of the present invention, a vehicle body mounting portion is formed integrally on either one of the front half portion side and the rear half portion side of the case.

A fourth aspect of the present invention is characterized in that, in the first aspect of the present invention, when the cooler is accommodated into the case, a resilient member is interposed in a non-coupling state between the cooler and an inner face of the case.

A fifth aspect of the present invention is characterized in that, in the first aspect of the present invention, the cooler is an oil cooler.

According to the first aspect of the present invention, since the cooler and the cooling fan are accommodated in the same case to form the cooler and the cooling fan into a unit, the cooler and the cooling fan can be handled as a single apparatus and the cooler and the cooling fan need not be mounted separately from each other on the vehicle body, the number of parts and the number of mounting man-hours can be reduced. Further, irrespective of whether the cooler is large or small, the cooling fan can be integrated with the cooler.

According to the second aspect of the present invention, since the case is divided forwardly and rearwardly into the front half portion side and the rear half portion side, if the cooler is accommodated into the front half portion side and the cooling fan is accommodated into the rear half portion side and thereafter the front half portion side and the rear half portion side are put together from forwardly and backwardly and coupled to each other by means of fastening screws or the like, then they can be formed into a unit simply.

According to the third aspect of the present invention, only if a vehicle body mounting portion is provided on either one of the front half portion side and the rear half portion side, mounting onto the vehicle body is allowed, and the number of mounting portions and the number of mounting man-hours can be reduced.

According to the fourth aspect of the present invention, since the structure wherein the cooler is accommodated and held in the case is adopted, only it is required to interpose a mount rubber member merely in a non-coupling state between the cooler and the case. Consequently, the necessity to use a rubber mounting structure formed as a bushing as in the prior art is eliminated, and the vibration-preventing structure is simplified and the number of parts and the number of mounting man-hours can be reduced.

According to the fifth aspect of the present invention, since the cooler is an oil cooler, in spite of the structure which does not have a frame on which a cooling fan can be mounted, the oil cooler and the cooling fan can be formed as a unitary member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, an embodiment applied to a four-wheeled vehicle is described with reference to the drawings. In the present vehicle, a pair of front wheels 2 and a pair of rear wheels 3 each formed from a low pressure balloon tire are supported on the left and right at forward and rearward portions of a vehicle body frame 1, respectively, such that they are driven by a power unit 4 carried at a central portion of the vehicle body frame 1, and are suspended by front shock absorbers 5 and rear shock absorbers 6.

Figure 2:
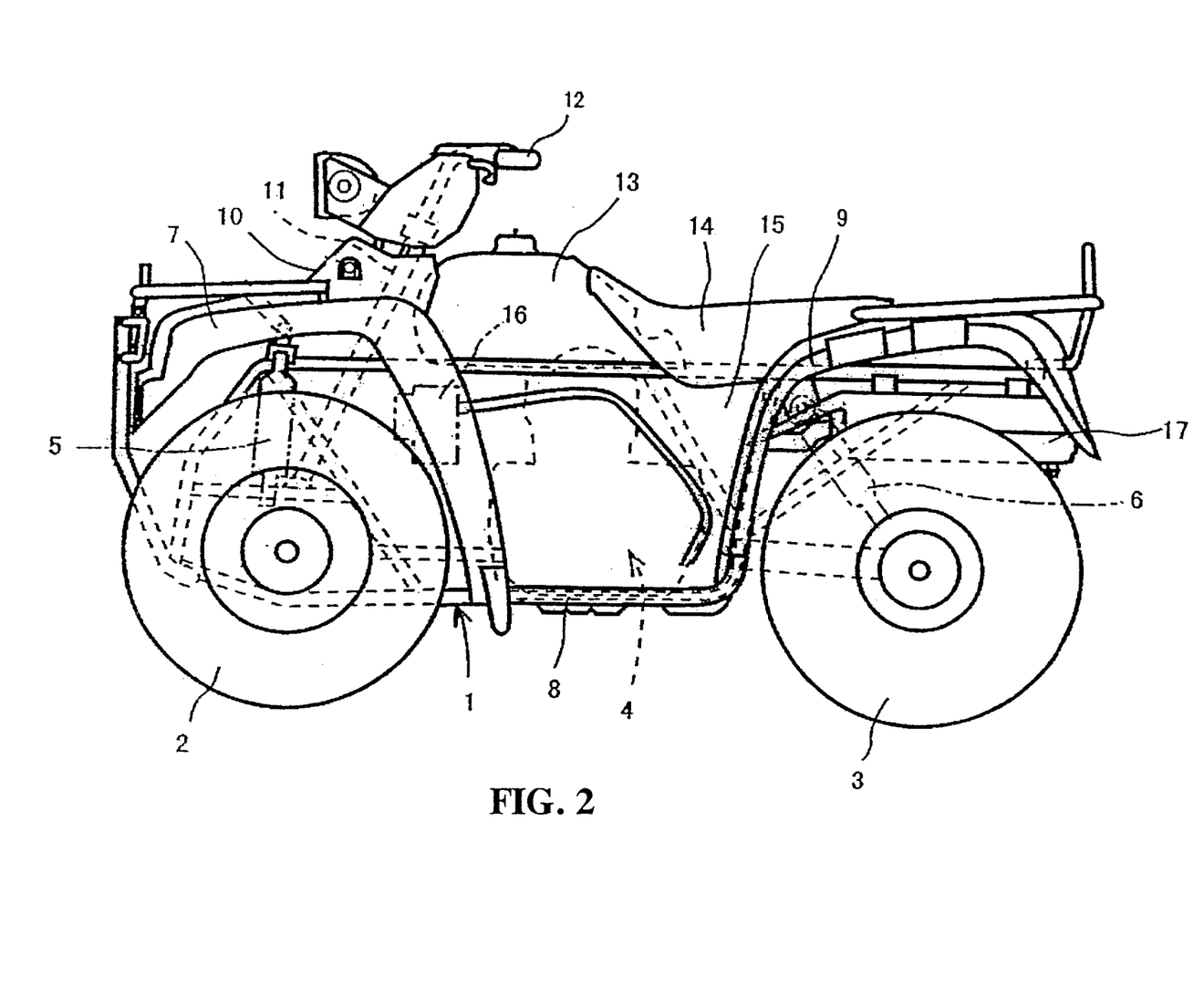
FIG. 2 is a side elevational view of a four-wheeled vehicle to which the embodiment is applied.
Figure 3:
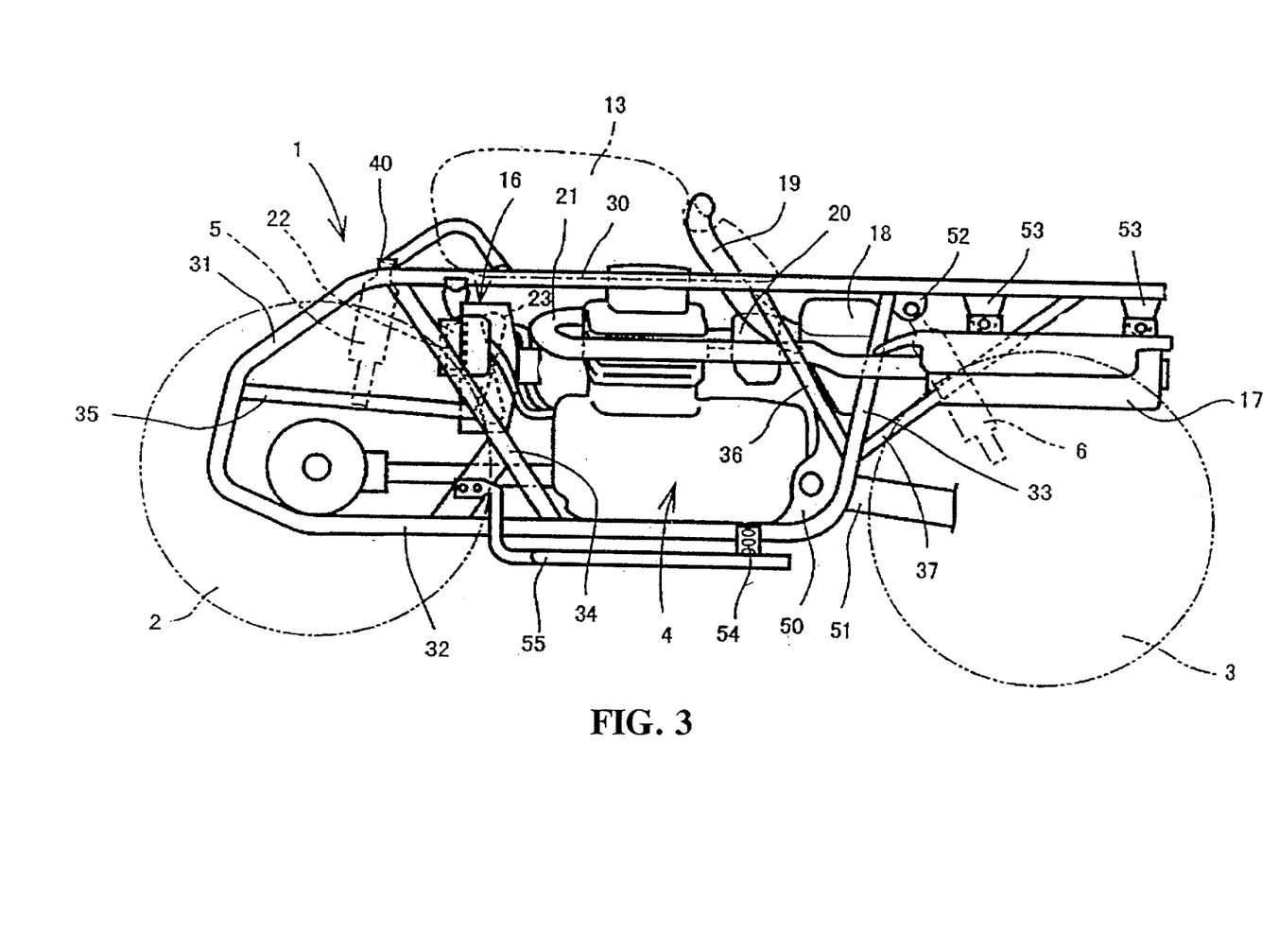
FIG. 3 is a side elevational view of a principal portion of the vehicle body of the four-wheeled vehicle.

As illustrated in FIG. 2, a front fender 7 is provided together with a sub fender 8 and a rear fender 9. Further, a front panel 10 is provided together with a steering shaft 11, a handle bar 12, a fuel tank 13, a saddle type seat 14, a rear panel 15, a cooling unit 16, and a muffler 17. Further, as illustrated in FIG. 3, an air cleaner 18 is provided together with a snorkel type duct 19 and a carburetor 20.

Figure 4:
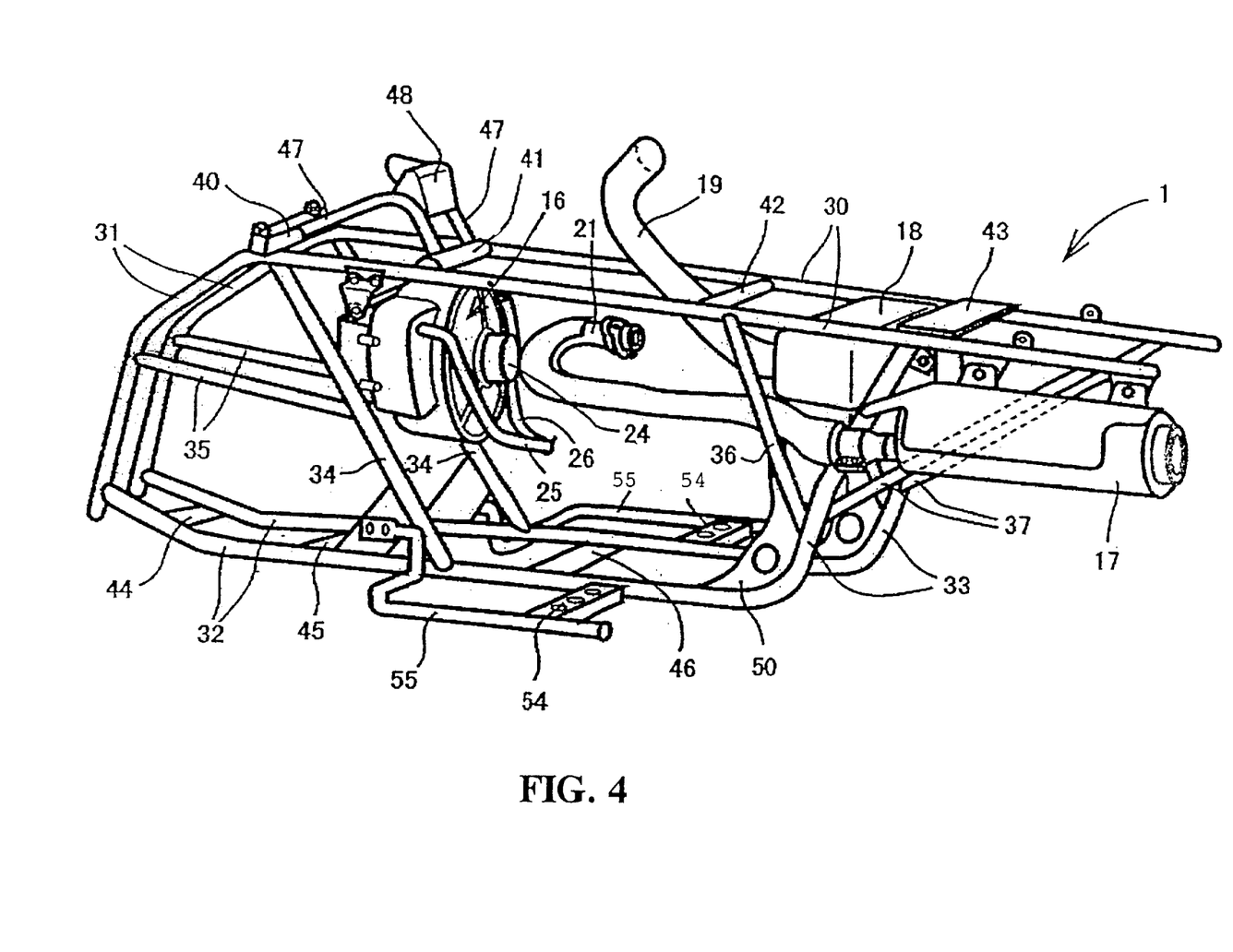
FIG. 4 is a perspective view of a similar portion.

Subsequently, the structure of the vehicle body frame 1 is described. As shown in FIGS. 3 and 4, the vehicle body frame 1 includes a pair of left and right upper pipes 30 that extend substantially in parallel and linearly in the forward and backward directions, a pair of left and right front pipes 31 extend in the upward and downward directions from the front end portions of the upper pipes 30, a pair of left and right lower pipes 32 extend rearwardly from lower end portions of the front pipes 31, and a pair of left and right center pipes 33 extend upwardly from rear end portions of the lower pipes 32 and connecting to rather rear positions of intermediate portions of the upper pipes 30.

The vehicle body frame 1 further includes a pair of left and right reinforcement pipes 34 connect obliquely from front end portions of upper pipes 30 to front half side portions of the lower pipes 32, a pair of left and right intermediate pipes 35 connect intermediate portions of the reinforcement pipes 34 and the front pipes 31 to each other in the forward and backward directions, and pairs of reinforcement pipes 36 and 37 obliquely connect intermediate portions of the center pipes 33 and front and rear positions of the upper pipes 30 on the opposite sides of the connection points of the center pipes 33 to the upper pipes 30. Between the left and right members, a cross member 40, cross pipes 41 and 42, cross members 43, 44, 45 and 46, and so forth extend, thereby forming the vehicle body frame 1 wherein all of the members are connected integrally.

Further, the cross member 40 extends between front end portions of the upper pipes 30. The cross member 40 and the cross pipe 41, which is disposed rearwardly in parallel to the cross member 40, are connected forwardly and backwardly to each other by head portion pipes 47 which have an inverted V-shape in the side elevation. Further, the steering shaft 11 is supported at an upper portion thereof for rotation by a stay 48 provided at top portions of the head portion pipes 47. A lower end portion of the steering shaft 11 is supported for rotation by a bearing member provided on the intermediate pipes 35.

Furthermore, upper end portions of the front cushions 5 are supported at the opposite left and right ends of the cross member 40, and lower end portions of the front cushions 5 are mounted on upper arms which form front wheel suspensions of the double wishbone type (not shown). The upper arms are supported swingably on the intermediate pipes 35, and lower arms paired with the upper arms are supported swingably at front end portions of the lower pipes 32.

Pivot plates 50 are provided at corner portions of lower portions of the center pipes 33 and the rear ends of the lower pipes 32, and front end portions of rear swing arms 51 are supported swingably on the pivot plates 50. The rear swing arms 51 accommodate a drive shaft which forms a rear wheel driving mechanism.

The upper pipes 30 extend further rearwardly from the connection portions thereof to the center pipes 33, and upper end portions of the rear cushions 6 are supported by stays 52 provided at the extending portions of the upper pipes 30 while the muffler 17 is supported by different stays 53.

An exhaust pipe 21 having a rear end portion connected to the muffler 17 extends substantially linearly forwardly and is bent substantially in a U shape at a front end portion thereof, and is connected to an exhaust port provided in a cylinder head of the power unit 4. Further, the cooling unit 16 is suspended and supported on the upper pipes 30 forwardly of the power unit 4. The cooling unit 16 includes an oil cooler 22 and a cooling fan 23 which are formed as a unitary member. A motor 24 is provided for the cooling unit 16 while hoses 25 and 26 are connected to the power unit 4.

Further, steps 54 extending outwardly sidewards are provided at portions of the left and right lower pipes 32 at which the power unit 4 is mounted. The steps 54 project outwardly sidewards from the lower pipes 32, and step frames 55 connect the ends of the steps 54 and the lower pipes 32 in a bent form. The sub fenders 8 (the sub fender 8 on the right side of the vehicle body is not shown) are placed on and attached to the step frames 55.

Figure 1:
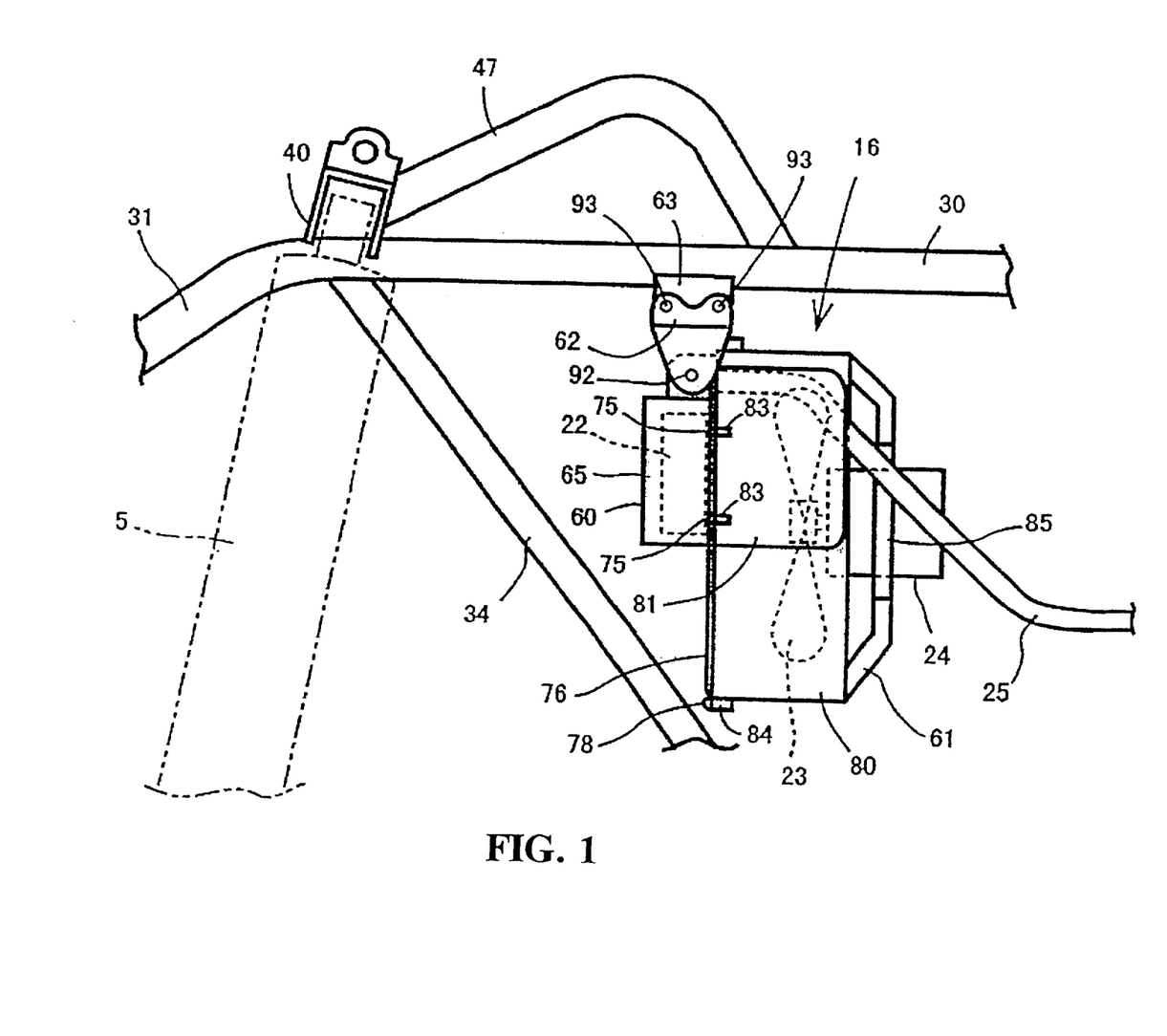
FIG. 1 is a side elevational view of essential part of a vehicle body to which an embodiment is applied.

Subsequently, a detailed structure of the cooling unit 16 is described. First, as shown in FIG. 1, the cooling unit 16 is constructed such that the oil cooler 22 and the cooling fan 23 are accommodated in a single case formed from a lid 60 and a fan cover 61 which are integrated with each other. The cooling unit 16 is suspended and supported by fastening the same by means of bolts to stays 63 welded to side faces of the upper pipes 30 through suspending brackets 62.

As the cooling fan 23 driven by the motor 24 rotates behind the oil cooler 22, outside air is introduced into the front face of the oil cooler 22 to forced cool oil heated in the oil cooler 22. The motor 24 is supported in the middle of a rear portion of the fan cover 61.

Figure 5:
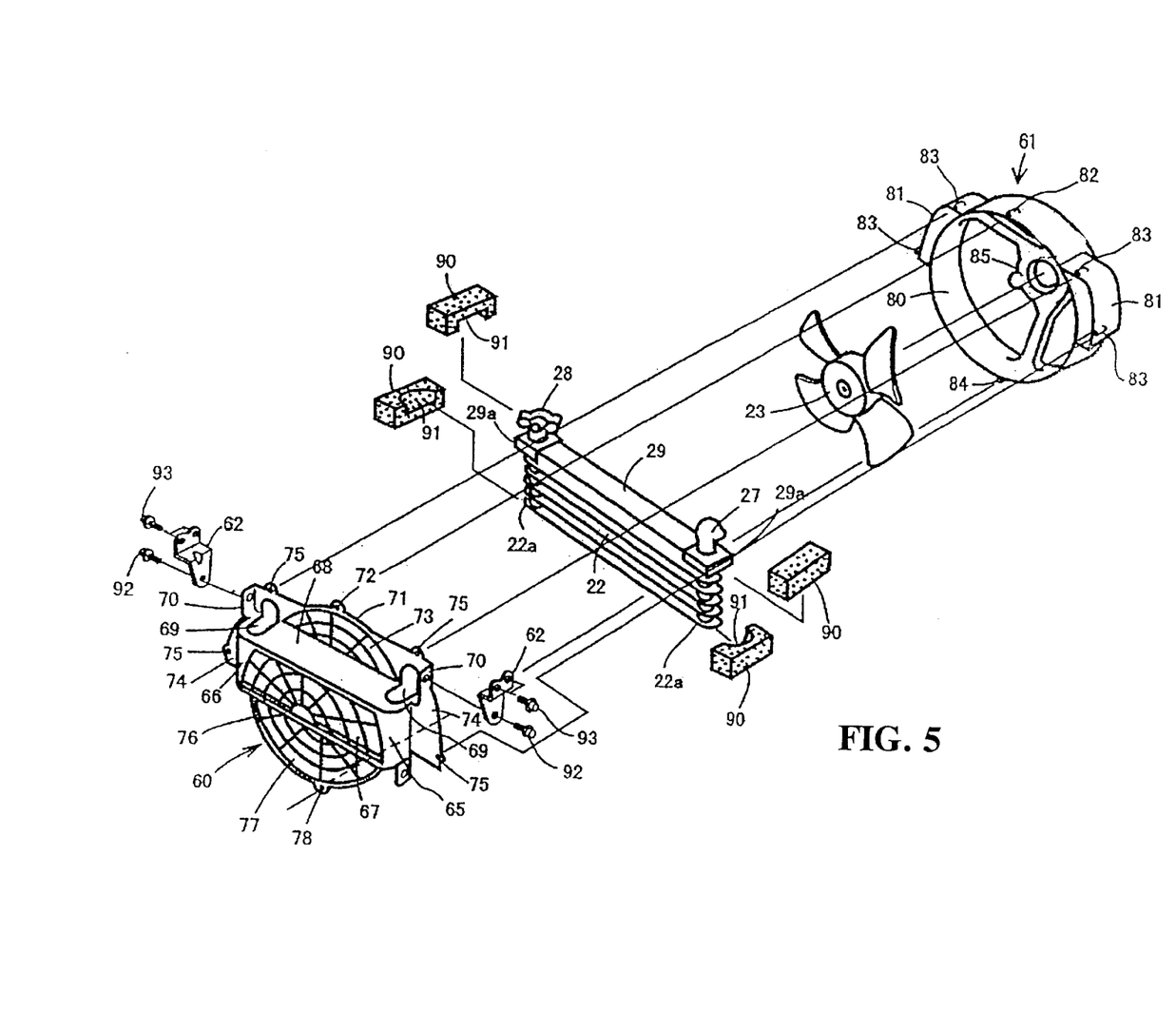
FIG. 5 is an exploded view of a cooler of the embodiment.

As shown in FIG. 5, the lid 60 is molded suitably of a synthetic resin and has an accommodation portion 65 which is a recessed portion which can accommodate the oil cooler 22. A large number of air vent holes 67 are formed in a front wall 66, and joint holes 69 and suspending projections 70 are formed integrally on the left and right of an upper wall 68. The suspending projections 70 project upwardly in an opposing relationship to each other from the opposite left and right end portions of the upper wall 68.

Further, the upper side of the lid 60 than the upper wall 68 forms a substantially arcuate upward projection 71, and a mounting projection 72 having a through-hole for a screw formed therein is formed integrally at a top portion of the upward projection 71. Further, a pair of mounting projections 75 are provided integrally on the opposite left and right sides of the upward projection 71 with respect to the mounting projection 72. Air vent holes 73 are formed also in the upward projection 71. Furthermore, a plurality of mounting projections 75 similar to the mounting projection 72 are formed integrally on the left and right sidewardly projecting portions 74.

Furthermore, also the lower side of the lid 60 and the accommodation portion 65 forms a substantially arcuate lower projection 76, and air vent holes 77 are formed in the lower projection 76. A mounting projection 78 similar to the mounting projection 72 is formed integrally at a lowermost portion of the lower projection 76. When the lid 60 in its mounted position is viewed from the front side of the vehicle body, a circular portion which substantially corresponds to a plane of rotation of the cooling fan 23 is formed from the upward projection 71, accommodation portion 65 and lower projection 76, and this portion forms a ventilation section in which the air vent holes 67, 73 and 77 are formed.

Meanwhile, also the fan cover 61 is a member molded suitably of a synthetic resin similarly, and includes a circular fan accommodation portion 80 for accommodating the cooling fan 23 and a pair of projecting portions 81 integrally projecting leftwardly and rightwardly from the fan accommodation portion 80. The fan accommodation portion 80 coincides at an outer periphery thereof with an outer periphery of the circular portion of the lid 60 described above, and bosses 82 and 84 provided at a top portion and a lowermost portion of the fan accommodation portion 80 coincide with the mounting projections 72 and 78 when the fan cover 61 is mounted on the lid 60.

A hub portion 85 through which a rotary shaft of the cooling fan 23 extends is provided integrally on the rear face side of the fan accommodation portion 80, and the driving motor 24 is mounted on the hub portion 85 such that the cooling fan 23 can be accommodated and supported for rotation in the fan accommodation portion 80.

The projecting portions 81 overlap, when the fan cover 61 is mounted on the lid 60, with the sidewardly projecting portions 74, and bosses 83 provided at edge portions of the projecting portions 81 coincide with the mounting projections 75 of the corresponding sidewardly projecting portions 74. It is to be noted that the bosses 82, 83 and 84 are formed integrally with the fan cover 61 and have insert nuts integrated therewith in advance.

It is to be noted that the rear face sides of the projecting portions 81 define spaces which are open to the rear and are communicated with a space above the upper wall 68 through the joint holes 69, and front end portions of the hoses 25, 26 are accommodated in the spaces while the hoses 25, 26 are connected to joints 27, 28 of the oil cooler 22, which are hereinafter described, through the joint holes 69.

The oil cooler 22 has a tank section 29 which has the joints 27, 28 provided at the opposite left and right end sides, and projecting end portions 29a extending in the leftward and rightward directions are provided at the opposite end portions of the tank section 29. The joints 27, 28 project upwardly of the upper wall 68 and forwardly of the upward projection 71 through the left and right joint holes 69 when the oil cooler 22 is accommodated in the accommodation portion 65.

Figure 6:
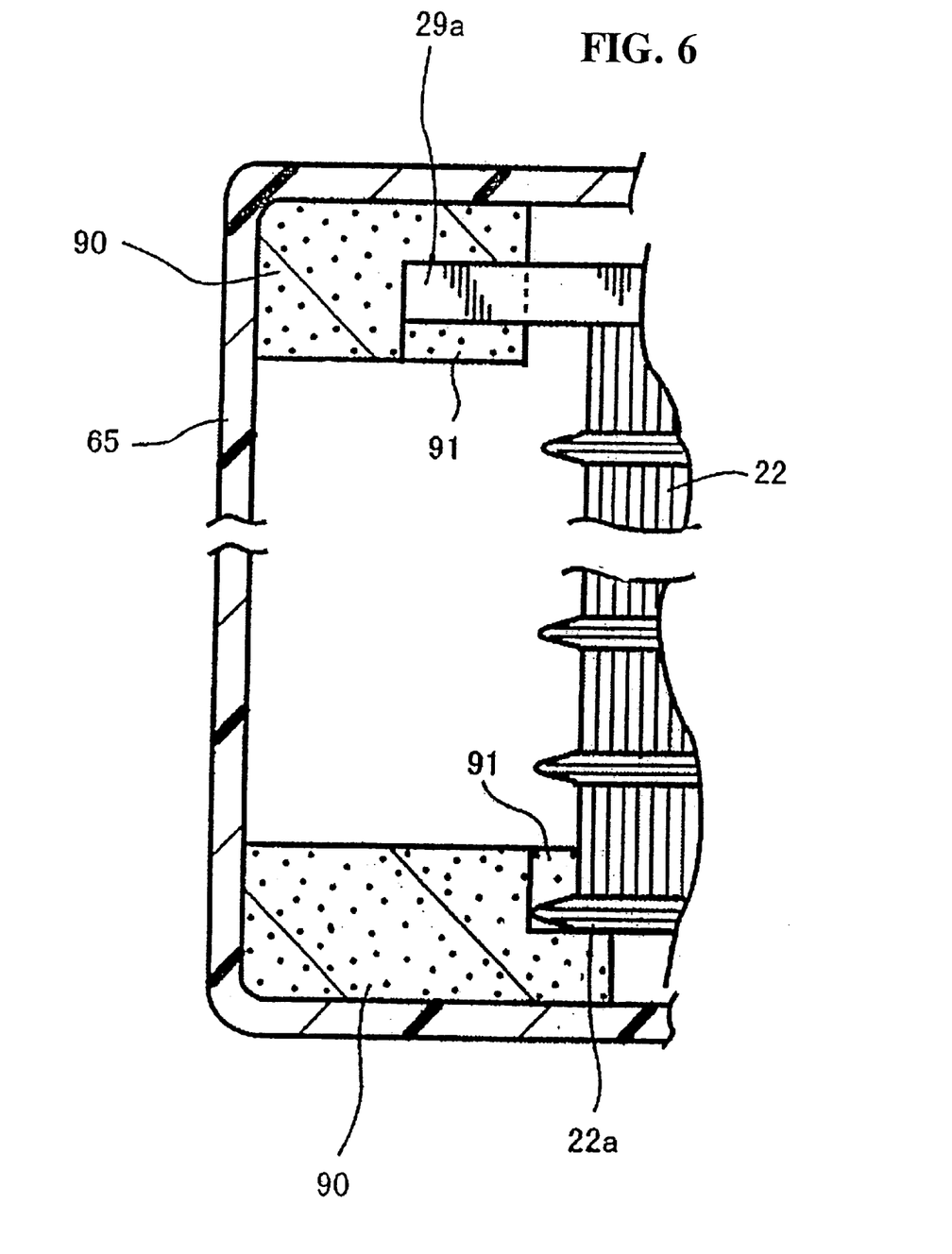
FIG. 6 is an enlarged sectional view of essential part of the cooler.

The oil cooler 22 accommodated in the accommodation portion 65 has damper rubber members 90 interposed at upper, lower and left, right corners thereof The damper rubber members 90 are not coupled to the oil cooler 22 but are merely pressed against the four corners in the accommodation portion 65 thereby to resiliently support the projecting end portions 29a on the left and right at upper portions of the oil cooler 22 and left and right lower side end portions 22a (FIG. 6).

In FIGS. 5 and 6, a recessed portion 91 is provided for fitting with any of the projecting end portions 29a and the lower side end portions 22a which are upper, lower and left, right corner portions of the oil cooler 22.

It is to be noted that the dimension of the oil cooler 22 in the upward and downward directions is smaller than the diameter of the cooling fan 23 and the oil cooler 22 does not have, on the left and right and lower sides, a frame structure by which the cooling fan 23 can be mounted. Meanwhile, bolts 92 and 93 are provided for attaching any of the suspending brackets 62.

Subsequently, the operation of the present embodiment is described. As shown in FIG. 5, the oil cooler 22 is accommodated into the accommodation portion 65 of the lid 60, and the lid 60 is placed together with the fan cover 61 having the cooling fan 23 accommodated in the fan accommodation portion 80 thereof in advance. Then, the mounting projection 72 and the boss 82, the mounting projections 75 and the bosses 83, and the mounting projection 78 and the boss 84 are aligned with each other, and the lid 60 and the fan cover 61 are fastened to each other by screws (not shown) from the lid 60 side. By this, the cooling unit 16 wherein the lid 60 and the fan cover 61 are coupled to and integrated with each other and the oil cooler 22 and the cooling fan 23 are accommodated in and supported on the inside of the lid 60 and the fan cover 61 is obtained.

This cooling unit 16 is suspended and supported on the upper pipes 30 only by attaching the suspending projections 70 provided at the upper portion of the lid 60 to the lower portion of the suspending brackets 62 by means of the bolts 92 and fastening the upper portion of the suspending brackets 62 to the stays 63 by means of the bolts 93. Consequently, the fan cover 61 side need not be attached to the upper pipes 30 separately from the lid 60.

Therefore, since the necessity to mount the oil cooler 22 and the cooling fan 23 on the upper pipes 30 separately from each other by means of suspending brackets for exclusive use as in the prior art is eliminated, the number of mounting brackets can be reduced to one half and also the number of man-hours for fastening by bolts can be reduced. Besides, since the distance between the oil cooler 22 and the cooling fan 23 can be made fixed, also the mounting accuracy is augmented.

Moreover, since the oil cooler 22 is resiliently supported on the lid 60 only by accommodating the oil cooler 22 into the accommodation portion 65 of the lid 60 with the damper rubber members 90 interposed therebetween, a non-coupled state wherein the damper rubber members 90 are not attached to the oil cooler 22 by direct fastening or the like can be established, and the necessity to use a rubber mounting structure using bolts and bushings as in the prior art is eliminated. Consequently, the vibration preventing structure can be simplified and reduction of the number of parts and the mounting man-hours can be achieved.

Since the dimension of the oil cooler 22 in the upward and downward directions is smaller than the diameter of the cooling fan 23 and besides does not have a frame structure on the left, right and lower sides, although it is impossible to directly mount the cooling fan 23, such oil cooler 22 and cooling fan 23 can be readily, integrally formed as a unit. Besides, even if the sizes of the oil cooler 22 and the cooling fan 23 vary differently, they can be combined with each other, and consequently, the degree of freedom in combination is high.

It is to be noted that the present invention is not limited to the embodiment described above and variable modifications and applications are possible within the range within which the essence of the invention is common. For example, the suspending projections 70 may be formed on an upper wall of the fan cover 61, instead of on the upper wall 68 of lid 60. In addition the cooler is not limited to the oil cooler 22 but may be a radiator, and besides, the dimension of it in the upward and downward directions may be greater than the cooling fan 23. Further, a suitable resilient member such as a metal spring or elastomer can be used in place of the damper rubber members 90.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling system for a vehicle comprising:
   a cooler; and
   a cooling fan disposed rearwardly and in the proximity of said cooler, said cooler and said cooling fan being supported on a vehicle body,
   wherein said cooler and said cooling fan are accommodated in a unitary case to form said cooler and said cooling fan into a unit, a portion of the case enclosing the fan including projecting portions projecting leftwardly and rightwardly thereof, and a pair of hoses extending rearwardly from the cooler and through the projecting portions of the case, and
   wherein said case is suspended from and supported by an upper pipe of the vehicle by attaching a vehicle body mounting portion provided on an upper portion of the case to the upper pipe.

2. The cooling system for a vehicle according to claim 1, wherein said case is divided forwardly and rearwardly into a front half portion side in which said cooler is accommodated and a rear half portion side in which said cooling fan is accommodated, and
   said front half portion side and said rear half portion side are put together in a forward and backward direction and are connected to and integrated with each other.

3. The cooling system for a vehicle according to claim 2, wherein the vehicle body mounting portion is formed integrally on either one of said front half portion side and said rear half portion side of said case.

4. The cooling system for a vehicle according to claim 1, wherein when said cooler is accommodated into said case, a resilient member is interposed in a non-coupling state between said cooler and an inner face of said case.

5. The cooling system for a vehicle according to claim 1, wherein said case includes an accommodation portion for receiving said cooler within said case and said case includes a fan cover for enclosing said fan whereby joining said accommodation portion with said fan cover forms a said unitary case for containing said cooler and said fan.

6. The cooling system for a vehicle according to claim 5, further comprising damper members disposed between said cooler and said accommodation portion for preventing vibration of said cooler.

7. The cooling system for a vehicle according to claim 5, wherein said fan cover includes said projecting portions extending outwardly therefrom and said accommodation portion includes projecting portions extending outwardly therefrom for mating with said projecting portions of said fan cover for securing said accommodation portion and said fan cover together.

8. A cooling system for a vehicle comprising:
   a cooler;
   a cooling fan disposed rearwardly and in the proximity of said cooler; and
   a case for housing said cooler and said cooling fan, said case including a fan cover for enclosing said fan and an accommodation portion for receiving said cooler, the fan cover including projecting portions on lateral sides thereof, and a pair of hoses extending rearwardly from the cooler and through the projecting portions, whereby joining the fan cover and the accommodation portion forms a unitary case to for enclosing said fan and said cooler as a unit,
   wherein said case is suspended from and supported by an upper pipe of the vehicle by attaching a vehicle body mounting portion provided on an upper portion of the case to the upper pipe.

9. The cooling system for a vehicle according to claim 8, wherein said case is divided forwardly and rearwardly into said accommodation portion on a front half portion side in which said cooler is accommodated and said fan cover on a rear half portion side in which said cooling fan is accommodated, and
   said front half portion side and said rear half portion side are put together in a forward and backward direction and are connected to and integrated with each other.

10. The cooling system for a vehicle according to claim 9, wherein the vehicle body mounting portion is formed integrally on either one of said front half portion side and said rear half portion side of said case.

11. The cooling system for a vehicle according to claim 8, wherein when said cooler is position in said accommodation portion, a resilient member is interposed in a non-coupling state between said cooler and an inner face of said accommodation portion.

12. The cooling system for a vehicle according to claim 8, further comprising damper members disposed between said cooler and said accommodation portion for preventing vibration of said cooler.

13. The cooling system for a vehicle according to claim 8, wherein said fan cover includes said projecting portions extending outwardly therefrom and said accommodation portion includes projecting portions extending outwardly therefrom for mating with said projecting portions of said fan cover for securing said accommodation portion and said fan cover together.

* * * * *